April 30, 1946.  W. E. PAKALA ET AL  2,399,377
ARC WELDING SYSTEM
Filed Dec. 3, 1942
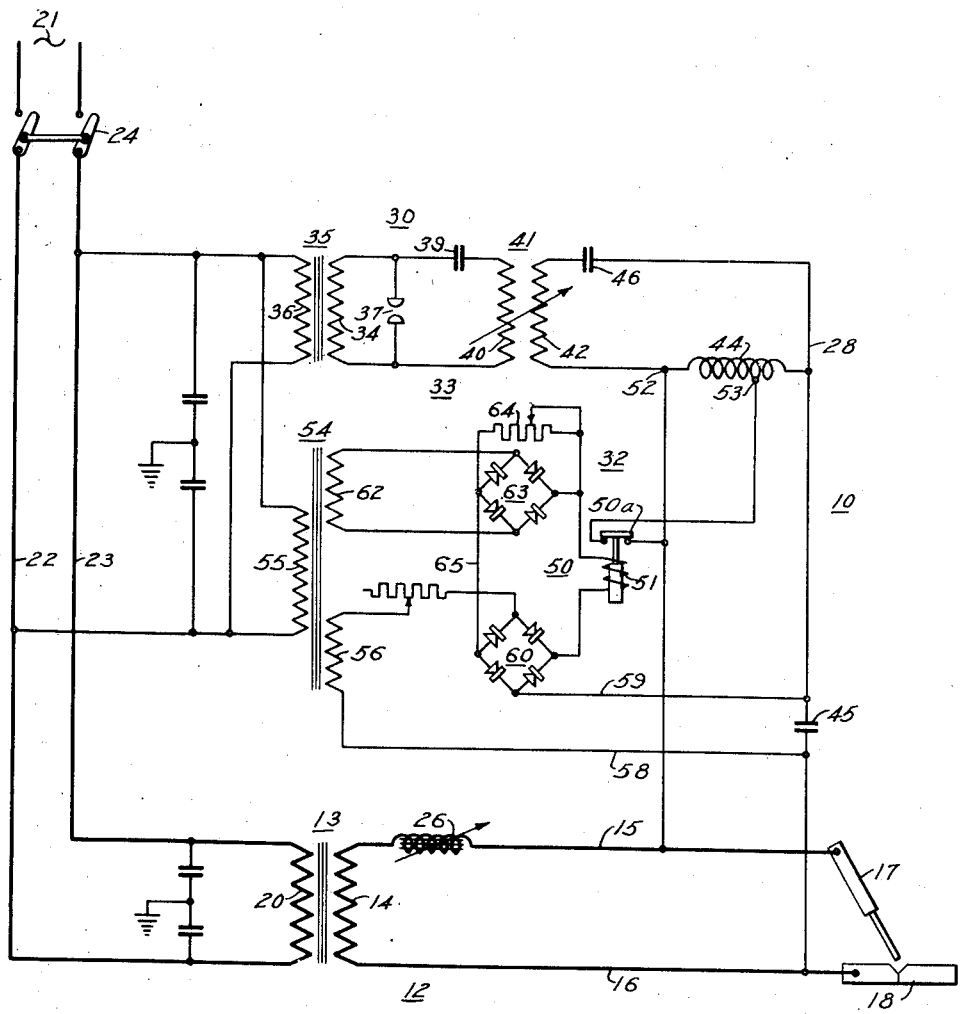
WITNESSES:
INVENTORS
William E. Pakala and
Alfred B. White.
BY
ATTORNEY Patented Apr. 30, 1946

2,399,377

UNITED STATES PATENT OFFICE 2,399,377

ARC WELDING SYSTEM

William E. Pakala, Forest Hills, and Alfred B. White, Murrysville, Pa., assignors to Westinghouse Electric Corporation, East Pittsburgh, Pa., a corporation of Pennsylvania Application December 3, 1942, Serial No. 467,722

10 Claims. (Cl. 315—174)

Our invention relates generally to arc welding systems, and it has reference in particular to arc welding systems having high frequency arc stabilization.

Generally stated, it is an object of our invention to provide a stabilized arc welding system that is simple and inexpensive.

More specifically, it is an object of our invention to provide for reducing the arc stabilizing high frequency voltage of an arc welding system during periods of non-welding.

It is also an object of our invention to utilize changes in phase and voltage of an alternating-current arc welding system for controlling the application of a high frequency arc stabilizing voltage thereto.

Yet another object of our invention is to provide for utilizing a control voltage proportional to the arc voltage of a welding system for controlling the application of a high frequency arc stabilizing voltage to the system and utilize a negative blocking potential for insuring deenergization of the control means whenever the welding circuit is interrupted.

Still another object of our invention is to provide for utilizing a high frequency generator having a plurality of coupled tuned circuits for applying arc stabilizing high frequency voltages of a plurality of predetermined frequencies to a welding circuit.

A further object of our invention is to provide for coupling a high frequency generator to an arc welding circuit by impedance means and varying the impedance thereof in response to a circuit condition of the welding circuit to vary the voltage of the high frequency generator.

A yet further object of our invention is to provide for protecting an operator against burns from a high frequency arc stabilizing circuit while retaining the high frequency voltage in part during periods of non-welding to assist in restriking an arc.

Other objects will in part be obvious, and will in part be explained hereinafter.

In accordance with one embodiment of our invention, a high frequency generator is coupled to an arc welding circuit by an air core transformer providing a tuned circuit including an impedance connected across the welding circuit. A control switch is provided for shunting a portion of the impedance so as to reduce the high frequency voltage applied to the welding circuit to a value which will not burn or sting an operator, but which will be of such value as to assist in completing a circuit between the electrode and work when it is desired to strike an arc. Energization of the control switch is effected by applying the differential between the arc voltage and a substantially constant control voltage to the operating winding of the control switch. A rectifier is used to rectify the differential of these voltages, and an additional unidirectional blocking control voltage is also applied to the winding in series opposition with the rectified differential voltage, to insure that the operating winding will be deenergized when the welding circuit is interrupted.

For a more complete understanding of the nature and the scope of our invention, reference may be had to the following detailed description, which may be read in connection with the accompanying drawing, in which the single figure is a diagrammatic view of a welding system embodying the principal features of the invention.

Referring to the single figure of the drawing, the reference numeral 10 may denote, generally, an arc welding system. The welding circuit 12 thereof may comprise a welding transformer 13 having a secondary winding 14 connected by conductors 15 and 16 to a welding electrode 17 and work 18 upon which a welding operation is to be performed. The primary winding 20 of the welding transformer may be connected to a source of alternating current 21 by means of conductors 22, 23 and a switch 24. An adjustable reactor 26 or any other suitable means may be provided for controlling the current in the welding circuit.

In order to assist in striking an arc between the electrode 17 and work 18, and provide for stabilizing the arc to prevent extinction thereof when the welding current momentarily is reduced to a zero value each half cycle, means, such as the arc stabilizing system 28, may be provided. The arc stabilizing system may, for example, comprise a high frequency generator 30 and suitable control means 32 for controlling the application of the high frequency voltage to the arc welding circuit.

The high frequency generator 30 may be of any suitable type, comprising, for example, an oscillating circuit 33 energized from a source of relatively high alternating-current voltage, such as the secondary winding 34 of a control transformer 35, the primary winding 36 of which may be connected to a source of alternating current, such as the source 21. The oscillating circuit 33 may comprise a spark gap 37 across the relatively high voltage secondary winding 34 of the control transformer and a condenser 39 connected in series circuit relation with a suitable inductance across the spark gap. For example, the condenser 39 may be connected in series with one winding 40 of a variable coupling high frequency transformer 41, the other winding 42 of the high frequency transformer being connected to the welding circuit 12.

The secondary winding 42 may be connected across an air core inductance 44 which may be connected in series with a low frequency blocking condenser 45 across the welding circuit 12. An additional condenser 46 may be connected in series circuit relation with the secondary winding 42 and inductance 44 to provide an additional tuned circuit coupled by the transformer 41 to the tuned circuit containing the primary winding 40, condenser 39 and the spark gap 37. By thus connecting the high frequency generator to the welding circuit, not only is the high voltage secondary winding 34 of the control transformer 35 isolated from the welding circuit, but a tuned circuit coupled connection is provided between the high frequency generator and the welding circuit which results in a plurality of different frequencies being applied to the welding circuit. Said different frequencies comprise two predominant frequencies separated by an amount determined principally by the coupling factor of the transformer 41, and a third frequency determined by the constants of the circuit including the secondary winding 42, condenser 46 and inductance 44, which occurs whenever the gap opens before the end of the primary wave train. The tuned circuit comprising the inductance 44, condenser 46 and the secondary winding of the transformer 41 functions as a band pass filter to reduce radio interference by reducing the transfer of the harmonics of the principal frequencies.

The control means denoted, generally, by the numeral 32 may, for example, comprise a control switch 50 having an operating winding 51. The control switch may be connected to normally shunt a major portion of the inductance 44 being, for example, connected between one terminal 52 thereof and a tap 53. The tap 53 may be so selected that a relatively low value of high frequency voltage, in the neighborhood of, for example, 200-300 volts, instead of the usual 750-1000 volts, may still be applied to the welding circuit when the principal portion of the inductance 44 is shunted. This reduced high frequency voltage has little or no harmful effect on the operator and assists greatly in completing a circuit when the electrode 17 is brought into engagement with the work 18.

In order to provide for controlling the operation of the control switch 50, suitable means, such as the control transformer 54, may be provided for producing a control voltage in opposition to the voltage of the welding circuit. The primary winding 55 of the transformer may be connected to a suitable source of alternating current, such as the source 21. The secondary winding 56 of the control transformer may be connected in series opposition with a voltage proportional to the voltage of the welding circuit being, for example, connected across the condenser 45 by means of conductors 58 and 59. Preferably, the voltage of the winding 56 is somewhat lower than the open circuit value of the voltage proportional to the welding circuit voltage, though higher than the welding value thereof. A rectifier circuit 60 may be provided for rectifying the differential between the voltages of the secondary winding 56 and the condenser 45 before applying it to the operating winding 51 of the control switch 50.

In order to insure deenergization of the control winding 51 when the welding circuit 12 is interrupted, a negative blocking or bias potential may be connected in series circuit opposition to the rectified differential voltage applied to the operating winding 51 in such a manner that it cannot energize the winding, but operates to block any excess of the arc responsive voltage from doing so on open circuit. For example, a tertiary winding 62 may be provided on the control transformer 54 and connected to a rectifier bridge circuit 63 having a shunt control resistor 64 connected in series circuit relation with the operating winding 51 and the bridge circuit 60 in opposition to the bridge circuit 60. The control resistor 64 provides a path in connection with the conductor 65 for the current through the operating winding 51, and may be of such a value that under open circuit conditions the output current of the rectifier circuit 63 is slightly greater than the maximum current through the winding 51 under welding conditions, so as to prevent the voltage across the rectifier circuit from rising above a safe value. The voltage of the bridge circuit 63 is preferably slightly greater than the differential which may exist between the voltage of the winding 56 and the condenser 45 under open circuit conditions. Thus, this differential is prevented from energizing the winding 51, and deenergization of the switch 50 is insured when the welding circuit is opened.

When the welding circuit 12 is open, the voltage across the condenser 45 is substantially equal to and in phase with the voltage between the electrode and the work. The voltage across the secondary winding 56 of the control transformer 54 is in phase with the condenser voltage, so that the differential voltage therebetween is relatively low. The negative bias potential produced by the bridge circuit 63 effectively counters any differential which might result from an unusually high open circuit voltage across the welding circuit. The operating winding 51 of the control switch 50 is, therefore, deenergized, and a portion of the inductance 44 is shunted by the normally closed contact members 50a of the control switch. The high frequency voltage applied to the welding circuit 12 by the high frequency generator 30 is thereby reduced to a substantially safe value which is not harmful to the operator, yet is sufficient to assist in completing a circuit between the electrode 17 and work 18 when it is desired to strike an arc.

As soon as the electrode 17 engages the work 18, the voltage of the welding circuit 12 is reduced and the phase thereof shifts because of the reactor 26, so that the bridge circuit 60 provides a differential voltage substantially in excess of the voltage across the condenser 45 to energize the operating winding 51 of the control switch 50. The control switch operates, opening contact members 50a and removing the shunt from the inductance 44. Accordingly, the full voltage of the high frequency generator 30 is immediately applied to the welding circuit to assist in striking and stabilizing an arc between the electrode 17 and work 18.

From the above description and the accompanying drawing, it will be apparent that we have produced an arc welding system wherein control of the arc stabilizing high frequency voltage is effected in a novel and efficient manner. The high frequency arc stabilizing system may be used with welding transformers having a relatively wide range of open circuit voltages without fear of the control switch failing to operate, since the use of the blocking potential assists in neutralizing variations in the welding circuit open circuit voltage. Positive operation of the control means governing the voltage applied to the welding circuit is insured, so that the high frequency voltage may not remain applied to the welding circuit at its full value accidentally. Since the inductance 44 bridges the high frequency circuit, stabilization of the high frequency voltage is insured even when the high frequency circuit is used with welding circuits having widely different circuit constants. By utilizing a normally deenergized control relay for governing the application of the high frequency voltage to the welding circuit, any failure of the control circuit will result in reduction of the high frequency voltage, thus further protecting the operator against burn or shock therefrom. The use of a plurality of tuned circuits in coupling the high frequency generator to the welding circuit not only insulates the welding circuit from the relatively high voltage circuits, but it reduces radio interference by acting as a band pass filter and also produces a plurality of different frequencies within the predetermined band of frequencies passed.

Since different embodiments of the invention may be made without departing from the scope and spirit thereof, it is intended that all the matter contained in the above description or shown in the accompanying drawing shall be considered as illustrative and not in a limiting sense

We claim as our invention:

1. The combination in an arc system, of a relatively low frequency arc circuit, a relatively high frequency generator, means including an inductance coupling the high frequency generator to the arc circuit, and determining the value of the high frequency voltage applied to the arc circuit and control means operable to shunt a portion of said inductance, whereby the high frequency voltage is reduced to and maintained at a lower operating value which is effective to assist in reestablishing the low frequency arc circuit.

2. The combination with an arc circuit, of a high frequency generator, circuit means coupling the generator to the arc circuit, an inductance connected in shunt relation with the generator, and control means responsive to interrupting of the arc circuit operable to shunt a portion of the inductance and detune the high frequency generator whereby the high frequency voltage is reduced to a lower operating value.

3. An arc welding system comprising, a variable voltage arc circuit, a high frequency generator coupled to the arc circuit, switch means operable to reduce the output voltage of the generator, a source of control voltage, circuit means including a rectifier connecting the source of control voltage in opposition to the arc circuit voltage to effect energization of the switch means, and circuit means providing a unidirectional control voltage in series opposition to the rectified differential voltage.

4. An arc stabilizing system for an alternating-current arc welding system including an arc circuit having a voltage variable between open circuit and arc circuit conditions comprising, a high frequency generator, circuit means including an inductive device coupling the generator to the arc circuit, control means for varying the inductance of the inductive device, a substantially constant source of alternating-current control voltage intermediate the open and arc circuit values of the arc circuit voltage, circuit means including a rectifier connecting the source of control voltage in opposition to the arc circuit voltage to produce a differential voltage for operating the control means, and means connected in series relation with the circuit means to provide a bias potential opposing the rectified differential voltage and insure deenergization of the control means when the arc circuit is opened.

5. An arc stabilizing system for an arc welding system having a relatively low frequency arc welding circuit comprising, a high frequency generator, a tuned circuit including a condenser and a plurality of inductance devices coupling the generator to the arc welding circuit, a control relay having an operating winding and contact members normally shunting a portion of one of said inductances to reduce the high frequency voltage, a source of substantially constant alternating-current control voltage intermediate the open and arc circuit values of the welding circuit, circuit means including a rectifier connecting the control source in opposition to the arc circuit voltage to apply the differential to the operating winding of the control relay, and additional circuit means connected to said circuit means to introduce an additional unidirectional control voltage in series opposition to the rectified differential voltage, said additional control voltage being at least equal to the open circuit differential between the arc circuit voltage and the substantially constant control voltage.

6. An arc stabilizing system for an arc circuit comprising, a high frequency generator including an oscillatory spark gap circuit and a tuned circuit including a plurality of inductances inductively coupled thereto to connect the generator to the welding circuit, control means operable to vary one of said inductances, and circuit means including a source of control voltages connected in opposition to the arc voltage for effecting operation of the control means to vary the inductance in the tuned circuit when the arc circuit is opened.

7. An arc stabilizing system for an arc circuit comprising, a high frequency generator, circuit means including a tuned circuit coupling the generator to the arc circuit, an inductance device for stabilizing and controlling the high frequency voltage having a winding with a plurality of turns connected in shunt with the circuit means coupling the high frequency generator to the arc circuit, and control means including a relay operable to vary the number of effective turns of the inductance means and detune the tuned circuit so that the high frequency voltage applied to the arc circuit is also varied.

8. A stabilizing system for an arc circuit comprising, an air core inductance winding connected to the arc circuit, a capacitor and a coupling winding connected in series circuit relation with the inductance to provide a coupling circuit tuned to a predetermined relatively high frequency, a high frequency generator including a tuned circuit of a capacitor and an additional coupling winding coupled to the aforementioned coupling winding, said tuned circuits being tuned to relatively close different high frequencies whereby a band pass filter effect is produced.

9. A stabilizing system for an arc circuit comprising, a high frequency generator including a tuned circuit of a capacitor and an inductance device tuned to a predetermined relatively high frequency, an additional inductance device connected in the arc circuit, and an additional tuned circuit including said additional inductance device, a capacitor and yet another inductance device coupled to the first-mentioned inductance, said additional tuned circuit being tuned to an additional relatively high frequency which is close to the frequency of the first tuned circuit 10. An arc stabilizing system for use with a relatively low frequency arc welding circuit comprising, a relatively high frequency generator, tuned circuit means coupling the high frequency generator to the welding circuit, inductance means having an intermediate tap connected in shunt relation with the coupling circuit for stabilizing the high frequency voltage when the arc welding circuit is open circuited circuit means connecting the inductance means to apply a high frequency voltage to the arc welding circuit, and means responsive to interruption of an arc in the arc welding circuit connected to the intermediate tap to shunt a portion of the inductance means.

WILLIAM E. PAKALA.
ALFRED B. WHITE.